United States Patent
Hoben et al.

(10) Patent No.: US 7,471,208 B1
(45) Date of Patent: Dec. 30, 2008

(54) PROCESS FOR CONTINUOUSLY MONITORING A FLUID STORAGE SYSTEM USING SYNCHRONIZED SENSORS

(75) Inventors: John Charles Hoben, Sugarland, TX (US); Allen Ray Westmoreland, Sugarland, TX (US); Alexander Bukhman, Houston, TX (US); Israel Bukhman, Houston, TX (US)

(73) Assignee: Innovative Measurement Methods, Inc., Sugar Land, TX (US)

( * ) Notice: Subject to any disclaimer, the term of this patent is extended or adjusted under 35 U.S.C. 154(b) by 285 days.

(21) Appl. No.: 11/473,659

(22) Filed: Jun. 23, 2006

(51) Int. Cl.
*G08C 21/00* (2006.01)

(52) U.S. Cl. .................. 340/622; 340/618; 340/612; 702/50; 73/292

(58) Field of Classification Search .......... 340/612, 340/618, 622; 702/50, 51, 55; 73/292, 299, 73/413
See application file for complete search history.

(56) References Cited

U.S. PATENT DOCUMENTS

| | | | |
|---|---|---|---|
| 4,593,561 A | 6/1986 | Gavrilovic | |
| 4,967,592 A | 11/1990 | Lagergreen et al. | |
| 5,086,403 A | 2/1992 | Slocum et al. | |
| 5,156,042 A | 10/1992 | Carlin et al. | |
| 5,469,249 A | 11/1995 | Magyar, Jr. et al. | |
| 5,706,857 A | 1/1998 | Dowling, Jr. et al. | |
| 5,942,980 A | 8/1999 | Hoben et al. | |
| 5,986,756 A | 11/1999 | Slater et al. | |
| 6,401,045 B1* | 6/2002 | Rogers et al. | 702/51 |
| 6,446,027 B1* | 9/2002 | O'Keeffe et al. | 702/183 |
| 6,817,227 B2 | 11/2004 | Thompson et al. | |
| 6,974,054 B2 | 12/2005 | Hutchinson | |
| 7,315,788 B1* | 1/2008 | Hoben et al. | 702/50 |
| 7,320,749 B2* | 1/2008 | Speece et al. | 210/85 |
| 2002/0189324 A1* | 12/2002 | Lipscomb et al. | 73/37 |
| 2006/0142974 A1 | 6/2006 | Scott et al. | |
| 2006/0144140 A1* | 7/2006 | Hache | 73/295 |

* cited by examiner

*Primary Examiner*—Timothy Edwards, Jr.
(74) *Attorney, Agent, or Firm*—Buskop Law Group, P.C.; Wendy Buskop

(57) ABSTRACT

A process for monitoring a fluid storage system using a vessel for storing the fluid and a detection apparatus using synchronized sensors for monitoring and measuring state properties of the fluid is disclosed. The method includes using a housing with at least one pressure sensor and at least one temperature sensor for synchronously collecting data regarding the fluid. Each sensor communicates with a processor and a signaling means to provide synchronized data. The method includes continuously forming at least one calculated value, such as a value for mass of the fluid, from the data synchronously collected using a processor, and continuously comparing the calculated value to at least one predetermined range of values for the fluid in the vessel to identify if the at least one calculated value is within the predetermined range of values. Then, the method includes communicating the compared values from the processor to an auxiliary device.

16 Claims, 5 Drawing Sheets

PROCESS FOR CONTINUOUSLY MONITORING A FLUID STORAGE SYSTEM USING SYNCHRONIZED SENSORS

FIELD

The embodiments relate to processes for monitoring and regulating a fluid storage system using a detection apparatus disposed in a vessel for synchronously collecting and processing data.

BACKGROUND

Large storage tanks are used to store hydrocarbon-based fuels and other products for future use. In many cases, these tanks are arranged close to one another to form tank farms. Probe assemblies and other detection and monitoring devices can be installed within or onto the tank to monitor the amount of fluid in the tank as well as the changes in conditions or state properties of the fluid, itself. However, many of the existing monitoring and detection devises are limited in their ability to compensate for changes in the storage tanks, such as bulging of the walls of the tank. In addition, many existing devices perform sequential measurements for monitoring state properties of the fluids which can create problems in consistency and accuracy of values.

A need exists for processes that use a highly sensitive monitoring and detection apparatus that is easy to manufacture and easy to install. A need exists for processes that have the ability to function using synchronized sensing devices for increased accuracy in measurements.

A need exists for processes that include the use of a multiple sensor housing for various types of hydrostatic tank samplings and hybrid method samplings. The sensors need to be able to perform synchronized measurements for increased accuracy and consistency with regard to measurements.

The embodiments meet these needs.

BRIEF DESCRIPTION OF THE DRAWINGS

The detailed description will be better understood in conjunction with the accompanying drawings as follows:

FIG. 1b depicts a top view of the embodiment depicted of FIG. 1a.

FIG. 2b depicts a top view of the embodiment depicted of FIG. 2a.

Figure 1A:
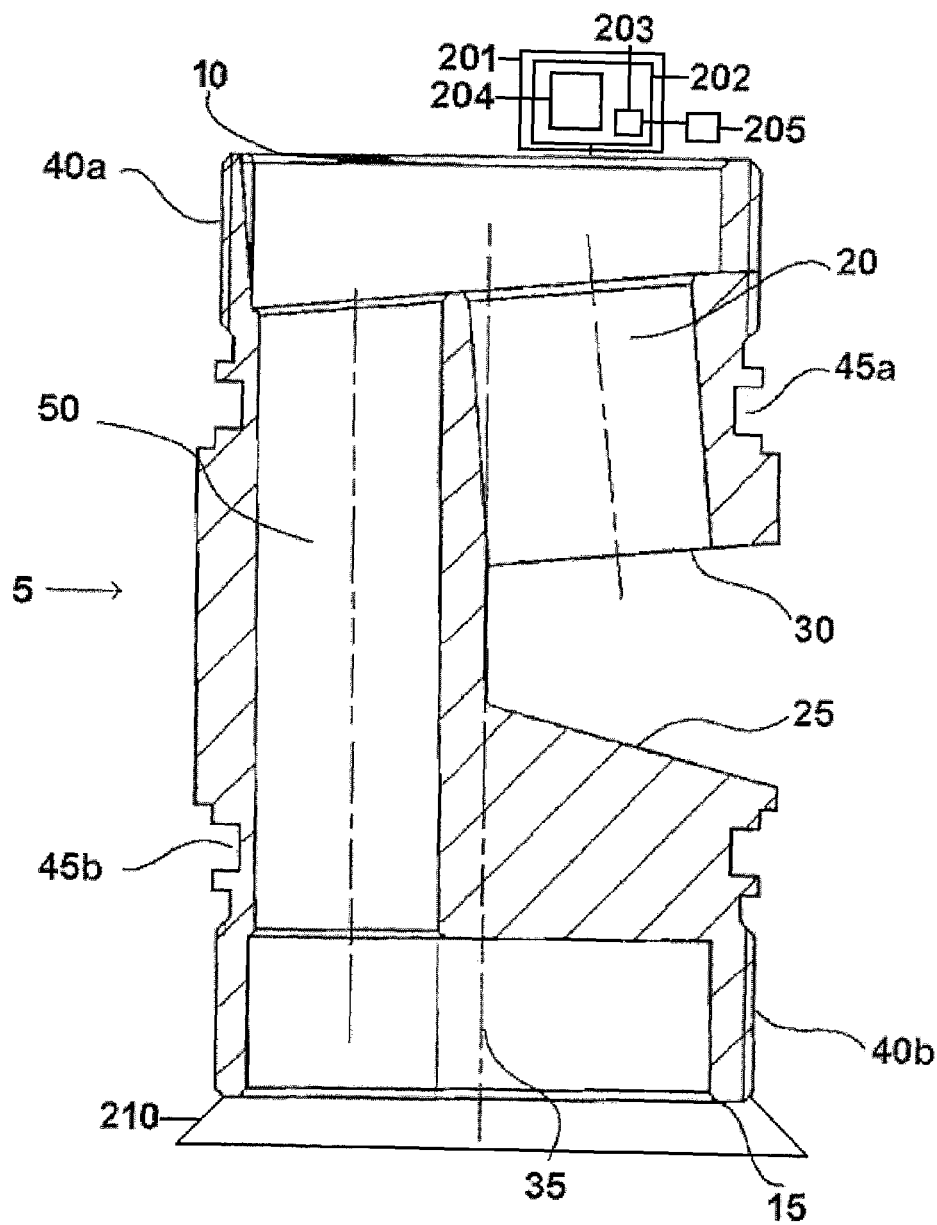
FIG. 1a depicts a cross-sectional side view of an embodiment of a housing of sensing module of the detection apparatus for use in vessels for measuring state properties of contained fluids.

The embodiments are detailed below with reference to the listed Figures.

DETAILED DESCRIPTION OF THE EMBODIMENTS

Before explaining the embodiments in detail, it is to be understood that the embodiments are not limited to the particular embodiments, and that they can be practiced or carried out in various ways.

The present embodiments generally relate to processes for monitoring and regulating a fluid storage system using a detection apparatus for synchronously collecting data. The embodiments of the processes include disposing the detection apparatus in a fluid in a vessel of the fluid storage system.

The processes include synchronously collecting data on such fluids as: a liquid, a gas, a fluid with a particulate matter, and combinations thereof, such as vapors which can be hydrocarbon based vaporous gases. The vapors can result from the gas or the liquid. Other examples of fluids that can monitored and measured can include water, wine, beer, gasoline, oil, pharmaceuticals, another hydrocarbon, a benzene, other organic chemicals, alcohol, acid, esters, inert gases, vapors thereof.

The embodiments of the processes include attaching the detection apparatus to different types of vessels, such as a tank, a chamber, a container, a vat, a barrel, a storage reservoir, or other storage containers. The vessels can be structures with or without floating roofs.

The processes include monitoring and regulating a fluid using a detection apparatus. The detection apparatus includes a housing adapted for engaging a tubular. The tubular can be composed of such durable material as machined stainless steel, plastic, a metal alloy, Kynar, composites, ceramic composites, and formed polymer blends such as polyvinyl chloride (PVC). The detection apparatus includes connecting the tubular to the housing, which can be made of the same type of durable material as the tubular and can have the same diameter and shape for connecting to the tubular.

The housing includes a housing top with a surface parallel to and beneath the housing top, a housing bottom, an outer surface, and a sloped inner surface sloping from the outer surface toward a housing axis. The outer surface can include a seal to provide a leak-proof, engagement between the housing and the tubular. The detection apparatus can comprise a secondary sloped surface for encouraging easy escape of fluids from the housing. This secondary sloped surface can be a smooth-walled surface, and is positioned below the sloped inner surface. Further, the embodied detection apparatus can include a mounting hole that is parallel to the vertical axis of the housing, wherein the mounting hole is adapted to receive a strain relief fastener.

The housing top includes at least one hole disposed through the surface of the housing top and angled to the housing axis. The angling of the hole can range from about 0.001 degrees to about 30.0 degrees as measured from the housing axis. The embodiments include intersecting the hole with the sloped inner surface of the housing.

The housing bottom and top are adapted for engaging a second tubular. As an example, the housing bottom can include threads disposed on the outer surface for engaging the second tubular. In an embodiment, a sleeve can be used for joining the second tubular to the first tubular. Additional sleeves can be used for forming an extended detection apparatus with two or more housings containing synchronized sensors, two or more tubulars, and the electronics head.

An embodiment of the process includes adapting the hole in the housing to fit one or more sensors, in which the sensors can include at least one pressure sensor and at least one temperature sensor disposed in a housing of the detection apparatus. The sensors can be disposed in the wall of the hole and flush mounted with the sloped inner surface. The housing can include additional holes for additional sensors. The holes sizes for the sensors can vary since temperature sensors can be different in diameter than pressure sensors.

An embodiment of the process includes flush mounting pressure sensors in the sloped inner surface for synchronously collecting pressure data. In another embodiment, multiple submersible sensors can be installed with flexible connectors, such as a wire or a chain, to the vessel for communicating sensor data to the processor.

The embodiments of the process include synchronously collecting and processing the data from each sensor by each sensor communicating with a signaling means and a processor. All of the sensors are connected to or transmit to a signaling means. The signaling means can be disposed above the hole in the detection apparatus for communicating sensor data with a processor in proximity to the housing top. Synchronized sensors' processing provides for simultaneous monitoring and measuring of the fluid, in real-time, to provide a higher level of accuracy and consistency for fluid measurements and flow calculations than other detection devices.

All of the sensors synchronously collect data, which means collecting data at the same moment in time. The data can be digital data, analog data, or combinations thereof. Then, the sensors communicate the sensor data at selected predetermined time intervals to the processor, which includes a memory for receiving the sensor data from the signaling means in communication with the sensors.

The embodiments of the process include using computer instructions stored in the memory for continuously forming at least one calculated value from the sensor data synchronously collected by the detection apparatus. Examples of the at least one calculated value include: a mass of the fluid, a fluid volume, average temperature of the fluid, a multiple spot temperature of the fluid, a multiple density strata of the fluid, an average density of the fluid, a level of the fluid, a fluid flow rate, an impurity content of the fluid, a vapor pressure, a vapor temperature, an atmospheric pressure, an atmospheric temperature, an entrained water content of the fluid, a free water content of the fluid, and combinations thereof.

Next, the process includes continuously comparing the at least one calculated value to at least one predetermined range of values for the fluid in the vessel to identify if the at least one calculated value is within the predetermined range of values and forming compared values as a result.

Then, the embodiments of the process include communicating the compared values from the processor to a data collector. This step of the process can include the processor transmitting the at least one compared value to an auxiliary device, such as a remote terminal unit (such as, a Bristol Babcock RTU for tubularline monitoring), a distributive control system (such as, a Honeywell DSC 3000), a supervised control and data acquisition (SCADA) system (such a, a Human Machine Interface system), a computer (such as, a PC), a tank gauge interface unit (such as, 1515 ETGI provided by Gauging Systems, Inc., of Houston, Tex.), and similar type devices. The process can transmit the values to a transceiver, such as a radio transceiver, a satellite, a cellular transceiver, or other similar type transceivers. In an embodiment, the transmitting of the calculated values, and results of the performed comparisons to the predetermined range of values, to an auxiliary device can be in real-time, to create a natural and seamless communication.

In an embodiment, the process can include locking a locking integrity bag over the processor of the detection apparatus for preventing tampering with the processor.

In an embodiment, the process contemplates that bottom reference data can be synchronously collected from a top mounted detection apparatus, that can be installed by suspending the detection apparatus from the interior roof of the vessel. In this embodiment, the process can include magnetically connecting the detection apparatus to the roof or the upper walls of the vessel by using a magnetic field. For example, a magnetic base can be connected to a flexible neck for threadably attaching or mounting the detection apparatus to the magnetic base, which creates a magnetic field for attachment to the walls or interior roof of the vessel.

Alternatively, the processes enable bottom reference data to be synchronously collected from a bottom mounted detection apparatus, in which the mounting of the detection apparatus can include a spaced apart relationship from a bottom most portion the vessel. In this embodiment of the process, a cone shaped spacer, a single leg device, or a multiple leg device can be used for mounting and spacing the detection apparatus with the bottom most portion the vessel. In an embodiment, the detection apparatus can be mounted in a vertical positioning for enabling the sensors to be properly placed and maintained for accurate synchronized sensing and measuring of the properties of the fluids in the vessel.

An embodiment of the process includes monitoring ambient pressures and temperatures by positioning a first portion of the detection apparatus above a roof of the vessel, and monitoring vapor pressures and vapor temperatures by positioning a second portion of the detection apparatus within an interior of the vessel and just below the roof. Examples of these types of data include: extreme pressures, extreme temperatures, formations of vacuums, high amounts of hydrocarbon emissions, other harmful chemical emissions from vessels, or combinations thereof. In an embodiment, the process includes providing immediate notifications and alarms to provide an alert of potentially harmful gases, liquids, and vapors that are escaping into the atmosphere and surrounding areas.

In an embodiment, the processes can include manually sampling a series of measured values from a well gauge of the vessel for performing comparisons of sampled values from the well gauge to values detected using the detection apparatus. For example, an embodiment of the process can include aligning the detection apparatus with a vessel's well gauge or gauge hatch located adjacent to or in proximity to the detection apparatus. The aligning is performed using a common reference point within the vessel so that uncertainties caused by comparisons with the manual gauging due to reference point movement or bottom movement of the vessel are eliminated.

Safety and environmental benefits for this process of monitoring a fluid storage system include improvements to accuracy of readings and measurement values with regard to the emissions of hydrocarbons and other possibly harmful chemicals.

Figure 1B:
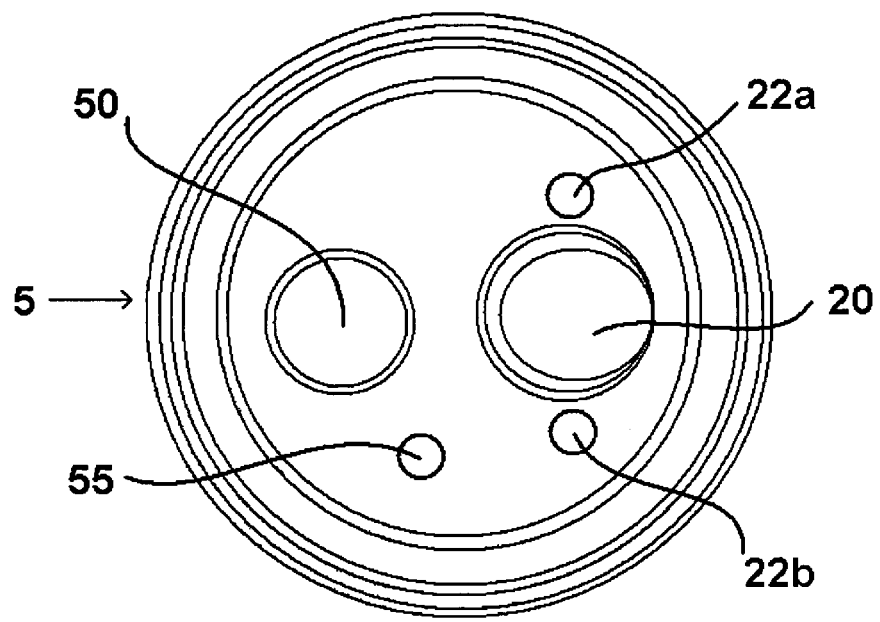

With reference to the figures, FIG. 1a depicts a cross-sectional side view of an embodiment of a housing of a detection apparatus (201) of sensing module of the detection apparatus for use in vessels (203) for measuring state properties of contained fluids and sending it to a data collector (205). FIG. 1b depicts a cross-sectional top view of the embodiment depicted if FIG. 1a. The housing (5) includes a top (10) and a bottom (15) with a hole (20). FIG. 1a further depicts a seal grooves (45a and 45b) on the exterior for a seal to provide a leak-proof, engagement between the housing and the tubular, such that the depicted sensor can function as a submersible sensor. As exampled, the housing (5) can connect to a tubular using threaded engagements (40a and 40a).

The housing (5) includes an outer surface and a sloped inner surface (30). The sloped inner surface (30) can slope from the outer surface toward the central axis (35) of the housing. The sloped inner surface (30) intersects with a hole (20) of the housing enabling a pressure sensor's diaphragm to be flush mounted in the sloped inner surface (30). A secondary sloped surface (25) can be formed in the housing opposite the inner sloped surface for easy escape of fluids from the housing.

As exampled in the figures, the hole can be centrally disposed in the top (10) and parallel to a central axis (35) of the housing (5) for holding sensors. As exampled, the hole (20) can be a smooth-walled aperture with a typical diameter of ⅝ inch. The range in diameter for the hole can be generally from about 0.5 inches to about 5.0 inches with a length from about 0.5 inches to about 10.0 inches. For example, a typical ¾ inch diameter hole formed in the housing can have about 1.0 inch in length. In FIG. 1a, the hole (20) is shown extending from the top (10) through to the sloped inner surface (30).

As an example, the sloped inner surface (30) can be sloped at an angle of from about 0.001 degrees to about 30.0 degrees from the imaginable surface perpendicular to the central axis (35) of the housing. As exampled in FIG. 1a, the sloped inner surface has an angled slope of 5.0 degrees from the central axis. The slope of the sloped inner surface should be adequate for fitting one or more sensors within the interior of the housing for detecting data and obtaining readings and measurements. The hole and the slope can be adapted for accommodating both at least one pressure sensor and at least one temperature sensor.

A processor (202) is depicted disposed near the top (10) of the housing (5), for receiving sensor data. The processor (202) includes memory (204) for storing data, and a transmitter (203) for transmitting readings to an auxiliary device (205). A locking integrity bag (201) is shown disposed over the processor (202) for preventing tampering with the processor (202). A spacer (210) is shown attached to the bottom (15) of the housing (5), for mounting the housing (5) a distance from the bottom of a vessel.

Figure 2A:
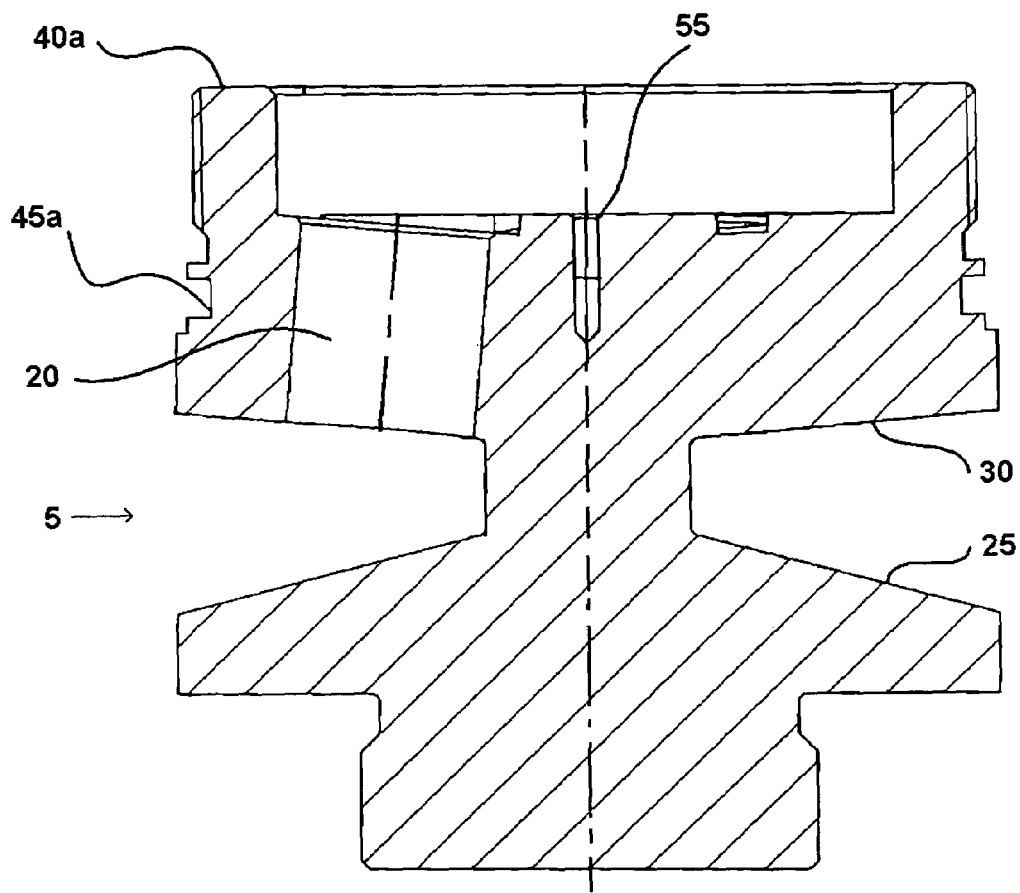
FIG. 2a depicts a cross-sectional side view of the bottom section of an embodiment of a housing of a detection apparatus with multiple sensor holes.
Figure 2B:
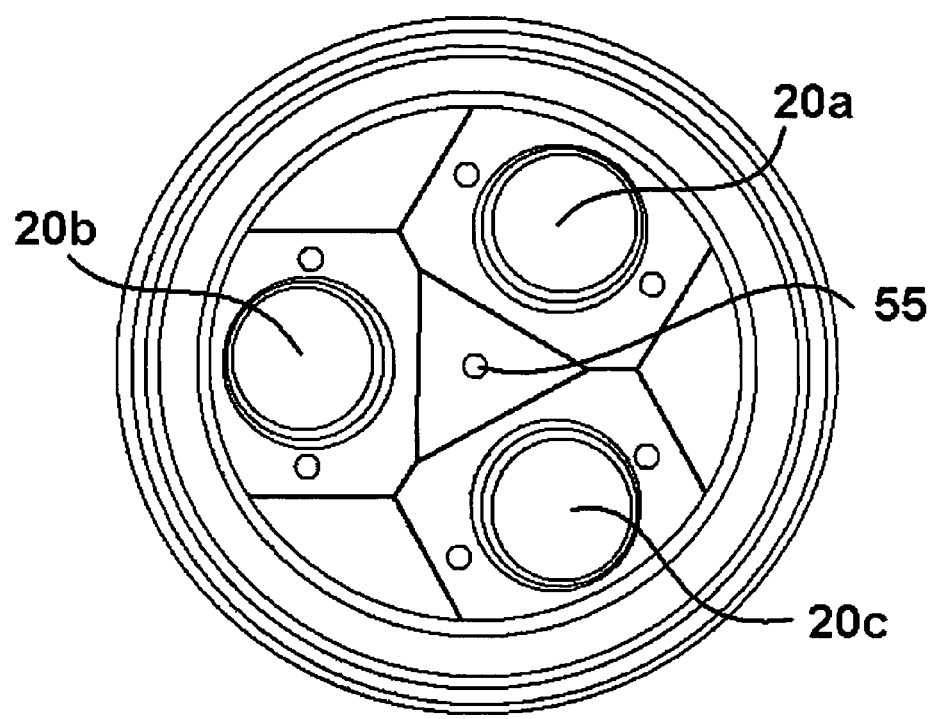

The processes include disposing sensors in the walls of the hole (20) of the housing for synchronously and simultaneously collecting data. FIG. 2a depicts a cross-sectional side view of the bottom section of an embodiment of a housing of a detection apparatus with multiple sensor holes. FIG. 2b depicts a top view of the embodiment depicted if FIG. 2a. FIG. 2a and FIG. 2b depict an embodiment with three sensors holes (20a. 20b. and 20c). The sensors are for synchronous and continuous measuring and monitoring or for redundancy. The sensors can be a combination of analog and digital sensors, or the sensors can be analog sensors or digital sensors, only. The sensors provide readings and measurements performed in synchronization and in real-time for increased accuracy. As an example, a pressure sensor usable in the hole of the detection apparatus for use in the vessel can be a piezo-resistive sensor with current or voltage excitation. As depicted in FIG. 2a and FIG. 2b, multiple holes can be drilled in the housing, wherein each hole can contain only a temperature and pressure sensor or combinations of two sensors. Each hole should extend from the top of the housing to the sloped inner surface of the housing, as depicted in FIG. 1a and FIG. 2a. FIG. 1b and FIG. 2b further depict threaded holes (22a and 22b), if needed, next to the sensor holes for sensor attachment.

Using multiple sensors in the housing provides redundancy that, in turn, can minimize downtime for maintenance. The enhanced detection provided by the embodied apparatus can aid in preventing toxic spills quickly and efficiently since leaks can be detected much quicker than before.

In another embodiment, the detection apparatus can have a sensor located above the roof of a vessel and a sensor located within an interior of the vessel for simultaneously measuring gas and vapor pressure above and below the roof for the purposes of structural roof damage prevention/alarming and gathering data for hydrocarbon emissions control.

The signaling device can be disposed in the walls of the hole (20) for communications between sensors and for communications with the processor. Examples of signaling devices usable with the embodiments include: wires, cables, fiber optics, a wireless link, or combinations thereof. FIG. 1a, FIG. 1b, FIG. 2a, and FIG. 2b depict the communication hole (50) to house the signaling device or devices.

A processor can be located on the top of the detection apparatus for processing data received from the sensors and transmitting values. The sensors themselves do not constitute a processor. The embodiments contemplate that the processor can be remotely located to the sensor housing. The processor can receive sensor data from the sensors and convert the sensor data to one or more values via calculation and computation for transmission to an auxiliary device. As an example, the calculation can compare the sensor data to preset limits or predetermined ranges of values that relate directly to the fluid in the vessel, or the type of vapor pressure being monitored. The processor can have memory and data storage for containing those comparative values, and for holding the algorithms for computing whether the monitored data is within the preset limits or ranges.

The processor can transmit the compared values to an auxiliary device with an interface, such as a graphical user interface and an interactive display, for displaying the calculated values and compared calculated values to a user. The processor can transmit using frequency transmissions; wireless transmissions; cellular transmissions; a network connection, such as Internet transmissions; and combinations thereof.

The auxiliary device, such as a computer, can be used for display of the compared calculated values and presentation of alarms, if needed, as in the situation of the calculated values exceeding the preset limits.

The embodiments can include a strain relief rod. The strain relief serves as relief of strain from the cable. The strain relief rod can be a threaded rod, a strap fastener, or another type of strain relief fastener. FIG. 1a and FIG. 2a depicts the hole for the strain relief pin (55).

The embodiments can include a joint sleeve located on an end of the tubular that is opposite from the attached housing. The joint sleeve can be used for threadably joining the first tubular to a second tubular to form an extended detection apparatus.

In one embodiment, the detection apparatus can attach to the bottom of a vessel using a magnetic shoe or foot section. Magnetic foot can be used to secure the bottom of the probe on the bottom of the tank, when such bottom is inclined or sloped. In another embodiment, the detection apparatus can be attached to the roof of the vessel by using clamps. In this embodiment, the top mounted bottom reference detection apparatus can hang from the roof of the vessel by using clamps that are secured around the tubular. The top mounted detection apparatus can attach to the vessels with a variety of roofs, such as, cone roofs, or other shaped roofs. In another embodiment, a slipping flange assembly can guide a portion of the detection apparatus through the roof of a vessel to allow roof movement without affecting the detection apparatus.

An embodiment of the detection apparatus can include a scratch resistant base. The scratch resistant base can be made from such materials as: Teflon™, a scratch resistant polymer, and combinations thereof, for protecting the vessel when the bottom mounted detection apparatus is installed. The scratch resistant base can be formed in various shapes, including: a square, a rectangle, an angled-shape, a circle, an oval, and combinations thereof. If there is a conical bottom, a magnetic shoe can be used. A flexible joint can be used to attach to the magnetic shoe.

In one embodiment, the process can include disposing and locking a locking integrity bag over a processor of the detection apparatus for prevention of tampering with the processor and detection-apparatus. The locking bag can be composed of a weather-proof material, such as NOMEX, and can include a radio lock. The radio lock can alarm a user as to a tampering or breach of security, such as the lock has been opened, the bag has been opened, or combinations thereof.

It should be clear that the invention probe can be formed with multiple housings each with multiple sensors. Probes can have between 2 and 150 housings each with multiple sensors are contemplated herein.

Figure 3:
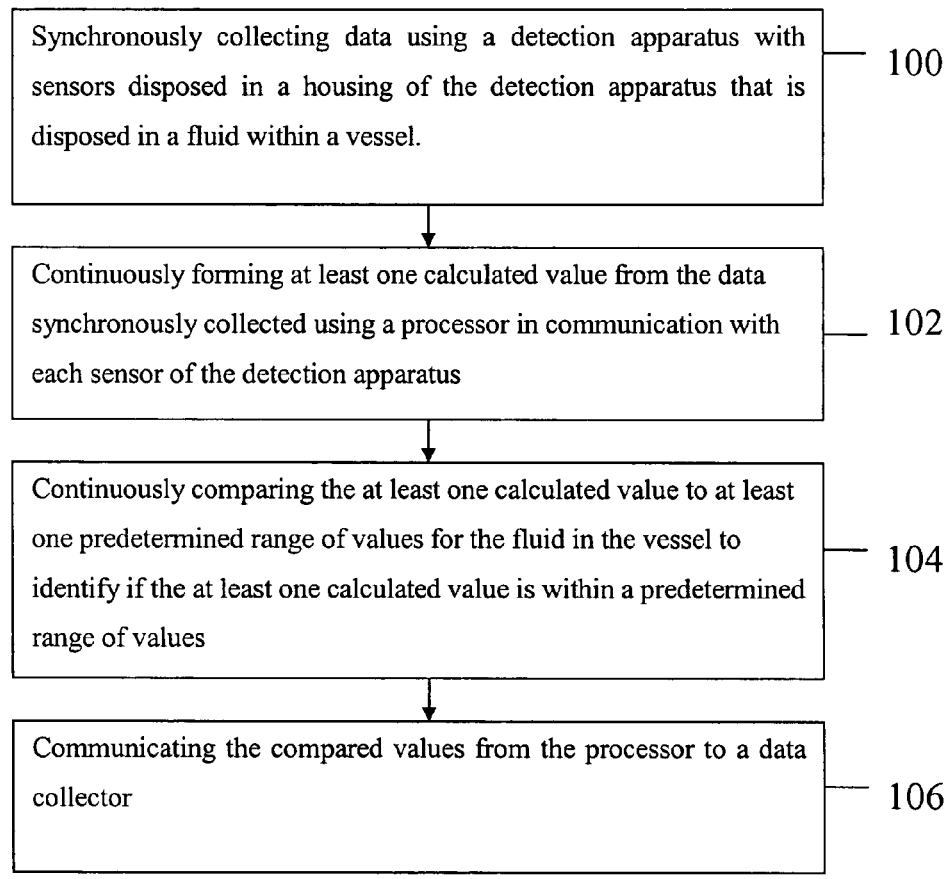
FIG. 3 depicts an embodiment of a process for monitoring a fluid storage system.

FIG. 3 depicts an embodiment of a process for monitoring a fluid storage system. The process includes synchronously collecting data using a detection apparatus disposed in a fluid in a vessel (Step 100). The detection apparatus can include at least one pressure sensor and at least one temperature sensor disposed in a housing of the detection apparatus, and each sensor can be in communication with a signaling means and a processor of the detection apparatus.

The next steps of process include continuously forming at least one calculated value from the data synchronously collected using the processor in communication with the sensors (Step 102). Examples of the at least one calculated value include: mass of the fluid, fluid volume, average temperature of the fluid, multiple spot temperature of the fluid, multiple density strata of the fluid, average density of the fluid, level of the fluid, fluid flow rate, an impurity content of the fluid, vapor pressure, vapor temperature, atmospheric pressure, atmospheric temperature, entrained water content of the fluid, free water content of the fluid, and combinations thereof.

The steps of the process continue by continuously comparing the at least one calculated value to at least one predetermined range of values for the fluid in the vessel to identify if the at least one calculated value is within the predetermined range of values (Step 104). Then, the process includes communicating these compared values from the processor to a data collector for monitoring and regulating the fluid storage system (Step 106).

While these embodiments have been described with emphasis on the embodiments, it should be understood that within the scope of the appended claims, the embodiments might be practiced other than as specifically described herein.

What is claimed is:

1. A process for monitoring a fluid storage system, comprising the steps of:
   synchronously and simultaneously collecting data at selected predetermined time intervals at the same moment in time using a detection apparatus disposed in a fluid in a vessel, wherein the detection apparatus comprises at least one pressure sensor and at least one temperature sensor disposed in a housing, wherein each sensor is in communication with a signaling means and a processor;
   a. continuously forming at least one calculated value from the data synchronously collected using a processor, wherein the at least one calculated value is selected from a member of the group consisting of: a mass of the fluid, a fluid volume, an average temperature of the fluid, a multiple spot temperature of the fluid, a multiple density strata of the fluid, an average density of the fluid, a level of the fluid, a fluid flow rate, an impurity content of the fluid, a vapor pressure, a vapor temperature, an atmospheric pressure, an atmospheric temperature, an entrained water content of the fluid, a free water content of the fluid, and combinations thereof;
   b. continuously comparing the at least one calculated value to at least one predetermined range of values for the fluid in the vessel to identify if the at least one calculated value is within the at least one predetermined range of values for forming a compared value; and
   c. communicating the compared values from the processor to a data collector.

2. The process of claim 1, further comprising collecting the data synchronously from each sensor with the processor.

3. The process of claim 1 further comprising collecting the data simultaneously from each sensor with the processor.

4. The process of claim 1, wherein the fluid comprises a member selected from the group consisting of a gas, a liquid, a fluid with particulate matter, and combinations thereof.

5. The process of claim 1, wherein the vessel is a tank, a chamber, a container, a vat, a barrel, or a storage reservoir.

6. The process of claim 1, further comprising magnetically connecting the detection apparatus to the vessel using a magnetic field.

7. The process of claim 1, further comprising locking a locking integrity bag over the processor of the detection apparatus to prevent tampering with the processor.

8. The process of claim 1, further comprising the step of positioning a first portion of the detection apparatus above a roof of the vessel to monitor atmospheric pressures and temperatures and positioning a second portion of the detection apparatus within the vessel just below the roof for monitoring vapor pressures and vapor temperatures within the vessel.

9. The process of claim 1, further comprising the step of manually sampling a series of measured values from a gauge well of the vessel to perform comparisons of measured values sampled from the gauge well to calculated values detected using the detection apparatus.

10. The process of claim 9, further comprising the step of transmitting in real-time the measured values and the calculated values and results of the performed comparisons to an auxiliary device.

11. The process of claim 1, wherein the data comprises a member selected from the group consisting of: a digital data, an analog data, and combinations thereof.

12. The process of claim 1, further comprising the step of installing the detection apparatus by suspending it from an interior roof of the vessel.

13. The process of claim 1, further comprising installing multiple submersible sensors in the vessel and connecting the multiple submersible sensors to the processor.

14. The process of claim 13, further comprising installing the multiple submersible sensors using a flexible connector.

15. The process of claim 1, further comprising the step of using a spacer to keep the detection apparatus in a spaced apart relationship from a bottom most portion of the vessel.

16. The process of claim 15, wherein the spacer is cone shape, a multiple leg device, or a single leg device.

* * * * *